S. S. ALLEN.
Harvester.
No. 10,201.
2 Sheets—Sheet 1.
Patented Nov. 8, 1853.
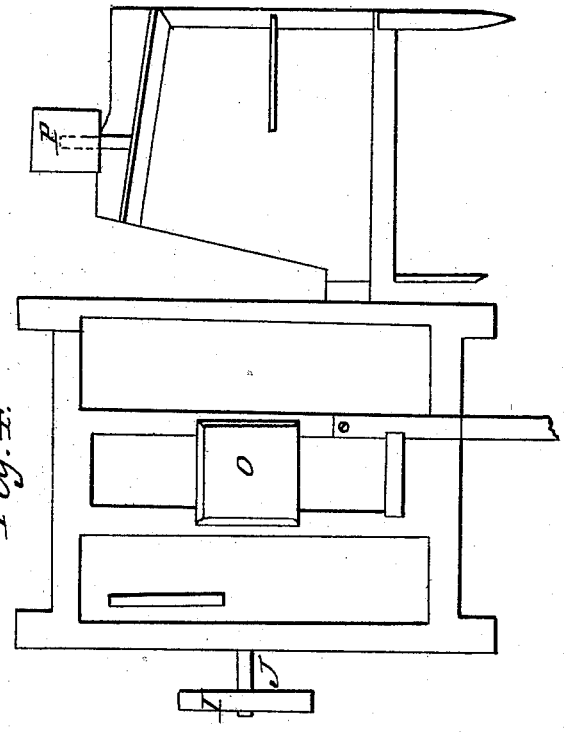
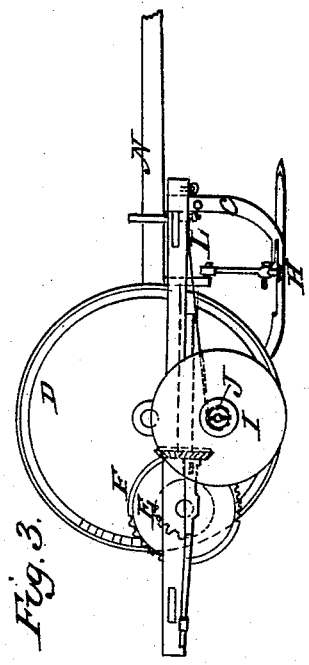
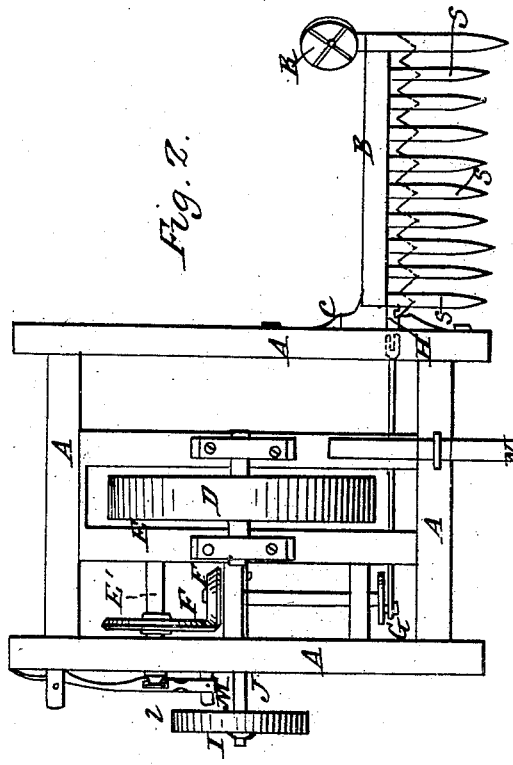
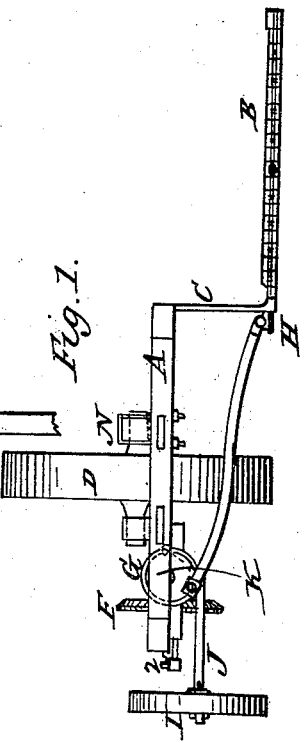

S. S. ALLEN.
Harvester.
No. 10,201.
2 Sheets—Sheet 2.
Patented Nov. 8, 1853.
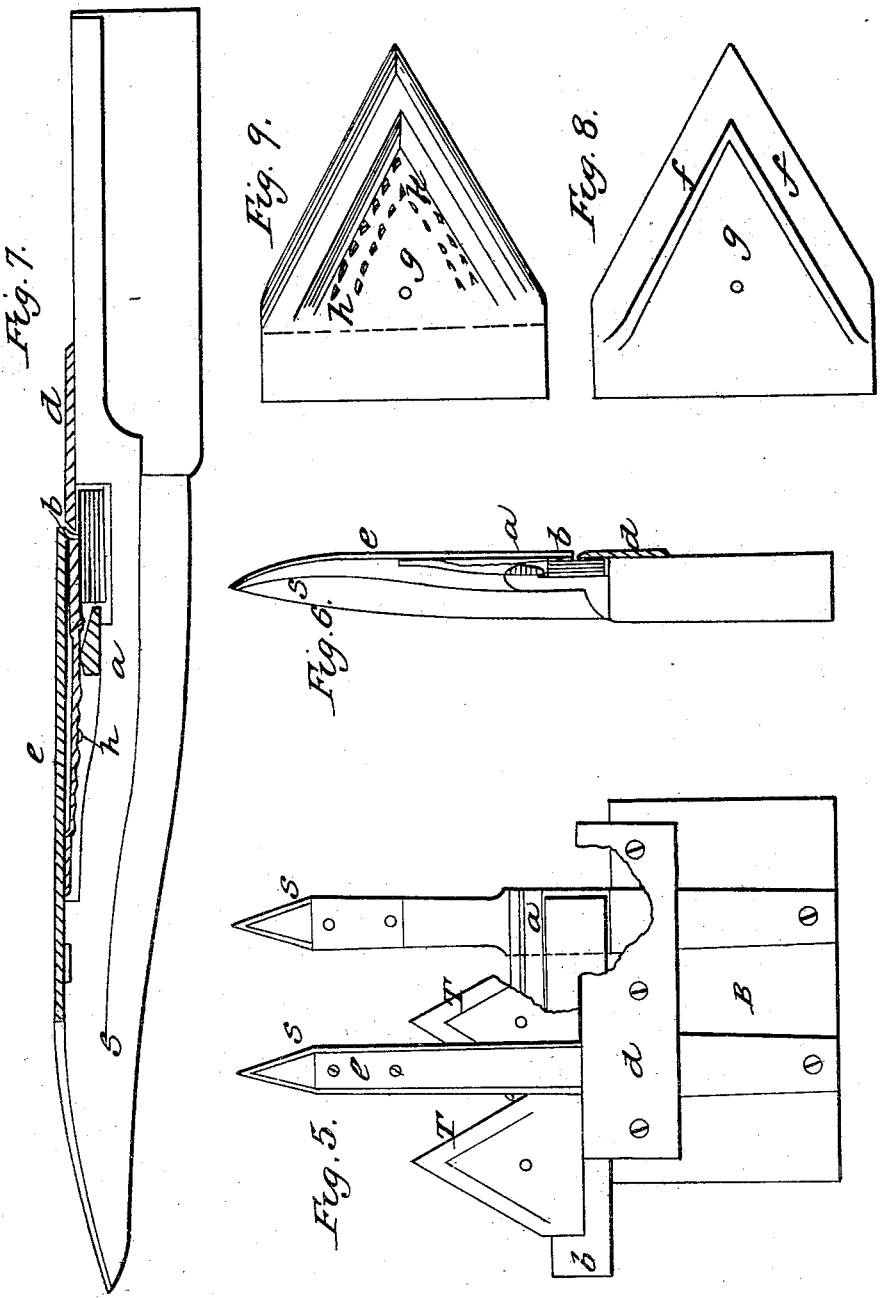

UNITED STATES PATENT OFFICE.

SAML. S. ALLEN, OF SALEM, NEW JERSEY.

IMPROVEMENT IN THE CUTTING-GEAR OF GRAIN AND GRASS HARVESTERS.

Specification forming part of Letters Patent No. 10,201, dated November 8, 1853.

*To all whom it may concern:*

Be it known that I, SAMUEL S. ALLEN, of Salem, in the county of Salem and State of New Jersey, have invented a new and useful Improvement in Harvesting and Mowing Machines; and I do hereby declare that the following is a full, clear, and exact description of the same, reference being had to the accompanying drawings, forming part of this specification, the same letters of reference being to like parts.

The nature of my invention consists in balancing the frame-work and gear operating the cutters on the driving-wheel as a center of oscillation, and thus counterbalance the weight of the arm and cutters thereon; also by an arrangement of the tongue or pole (by which the machine is drawn) between the driving-wheel and the cutter arm or beam as to constitute it a center draft by the application of the adjustable secondary wheel on the side of the framing opposite to that of the cutter-arm, and thus overcome the tendency to sway or swing round against the shoulder of the horse found in other harvesters; and, further, by an arrangement of a spring and swung axle carrying the above wheel any desired approach of the outer end of the cutter-beam to the earth may be given, and the tendency of the beam to rise overcome, while it is readily accommodated to any irregularity of the surface. This is an important consideration in mowing grass, as the heaviest burden or crop is that at the foot of the stalk or stem. In my improved construction of the teeth and cutters, so as to admit of balancing the blade of the cutters on an angular rib by the weight of the slide-bar to which they are attached, the edges are kept in close contact with stationary shear-shaped blades, and the cutting wet or lodged grass and grain is effected, while by the rasping portion of the cutter-blade the soft grass usually collecting under the front of those blades, and thus clogging the fingers of the harvester, is rubbed or rasped out from the slot, and choking is effectually prevented, while at the same time the dish form of the blade affords a receptacle for oil to the cutter-bar and angle-bar on which the blades slide. In the construction and form of the finger wherein the general curve bends the point lower than in other machines it causes it to enter freely under lodged or fallen grass instead of sliding over it, while by constructing that portion of the finger constituting the guard of malleable iron, and the angular-edged blade or cutter of cast-steel, which can be replaced or sharpened when necessary, an efficient and cheap cutter and finger may be produced.

To enable others skilled in the art to make and use my invention, I will describe its construction and operation, as follows:

Figure 1 is an elevation, and Fig. 2 a bird's-eye view, of the machine when used as a grass-cutter or mowing-machine. Fig. 3 is a side elevation, and Fig. 4 is a view when the machine has the grain-platform attached and the seat for the driver on the frame in place, as well as the openings in said frame covered to prevent accident from the machinery.

In the several figures, A A A A represent the framing of the harvester; B, the cutter-beam; C, an iron arm by which the cutter-beam is attached to the framing; D, the driving-wheel, having cogs on the inner face of the rim, (see Fig. 3,) thus producing a large master-wheel, and admitting of large-sized cogs and pinion in getting up the requisite speed of the cutters, thus securing against accident consequent to a small-size master-wheel and pinion; E, a pinion meshing into the said master-wheel, placed on shaft E', on which is the bevel-gear F F, giving motion to the cam G, actuating the slide-bar H and cutters thereon, (hereinafter more particularly to be described;) I, the secondary wheel turning on J, a swung axle pivoted at K, so as to admit of raising or depression of frame A A.

L, Fig. 3, is a strong flat spring fastened to the under side of the framing by a bolt and regulating-screw, while the other end wraps around the axle J, thus admitting the depression of the frame on that side. On the outer end of the shaft E' is a flange, 2, which, dropping into a recess in the movable lever M, readily slides the bevel-gear F and arrests the cutters by throwing out of gear.

N is the pole or tongue, to which the horses are attached. It is secured to the frame between the master-wheel D and cutter-beam B.

O, Fig. 4, represents the position of the driver's seat over the center of the master-wheel, which it incases, thus preventing accident.

P is the raker's seat, who is placed with his face toward the standing grain; Q, the platform on which the cut grain is received. It carries a small trundle-wheel on its outer side, and there is also a pivoted wheel under the seat P.

R in Fig. 2 is a small (about eighteen inches diameter) wheel furnished with ribs on its upper side. It is secured to the rear and outer end of the beam B when the machine is used for mowing. It is for the purpose of forming a parting-line between the cut grass and the standing, and is placed on a slightly-inclined journal, so as to touch the earth with its inner edge, and thus cause rotation and throw off the grass as received, and clear the track for the iron arm C of the cutter-beam. The shaft carrying the bevel-gear F and cam G, vibrating the cutters, is secured in bearings in short pieces of the framing, and thus any liability of being shaken or loosened in the rapid motion necessary is obviated, while at the same time the frame itself is strengthened. On the grain platform is placed one or more guides, by which the cut grain is received and in which the points of the ordinary grain-fork used by the raker may be introduced, and the grain passed off the side of the platform under the framing.

In changing from a grass to a grain machine the arm C is raised, and thus the cutter-beam also raised, as a long stubble in grain is of no consequence; but in grass-cutting the beam and cutters are made to approach the earth as near as possible.

The description of the cutters and fingers is as follows: Fig. 5 is a portion of the beam, with fingers S S secured thereon, and cutter-blades T T in place; Figs. 6 and 7, side views of the fingers, with cross-section of cutter-blades, angular bar $a$, on which they slide, sliding bar $b$, on which the blades are secured by rivets on the upper side thereof, leaving a margin on the bar $b$ for the binding-plate $d$, under which the bar slides; $e$, the removable blade, formed with edges like scissor-blades, and are of the best steel. Their object is to cut the grass by their edges, not to permit it to be merely broken against by the vibrating cutters. They are fastened by screws on the upper side of the malleable-iron fingers S S, which are secured by screws on the upper side of the wooden bar B by inserting the thickness of the tangs in the wood, and, from the curved form given the point of the finger, are made to approach, indeed to slide on, the earth in cutting grass, while at the same time they offer no obstacle to the grass flowing over the beam as in a stream.

Fig. 8 shows the upper side of the cutter-blade, triangular in its form, having its center depressed by swaging the thin steel of which it is composed, thus providing a margin or border, $ff$, the under side of which reduced by grinding, so as to leave an edge to play in close contact, like shears, with the blade $e$ of the finger.

Fig. 9 exhibits the reverse side of the cutter, in which the triangular swaged portion $g$ has a series of teeth, $hh$, raised thereon, forming on the under side of the blade, when in position, a coarse rasp, by which all soft grass, usually choking the slot in the finger under the point of the cutter, is effectually removed. This has been a difficulty with all other forms of cutters, as the soft grass has a tendency to be drawn in the slot, and then, falling over each side of the finger, soon clogs the motion of the cutters and greatly increases the labor of the team, whereas by the continued rasping it is removed; also, by the flat surface or margin $f$ on the upper side of the blade, acting against the lower side of blade $e$, it is self-sharpened, and cuts grass or wet grain as it were by a pair of shears, the weight of the sliding bar overbalancing that of the blades. By placing the driver's seat over the driving-wheel he is enabled, by slight change of position, to raise or depress the cutter-beam, thus enabling him to pass from field to field on the road with great facility and safety to the cutters, while by the use of the secondary wheel I and spring L the cutters are kept to their work in mowing, at the same time accommodating the cutter-beam to any inequality of the surface independent of the driver being on his seat.

Having described my improvements, what I claim as my invention, and desire to secure by Letters Patent, is—

1. The arrangement by which the driving-wheel D is made the center of oscillation in counterbalancing the cutter-beam and cutters thereon, in combination with the secondary wheel I and spring L, for the purposes set forth.

2. The arrangement of the tongue N with the driving-wheel D and secondary wheel I, for the purposes set forth.

3. The method of balancing the cutter-blades T on the angular bar $a$ by the sliding bar H, in combination with the blade $e$, or their equivalents, for the purpose set forth.

4. The construction of the cutter-blades, as formed on the under side, with a rasp or roughened surface, while the upper side forms a shear-cutting edge for the purpose of preventing choking of the fingers, and supplying an oil-box to the cutter-bar, as set forth substantially in the foregoing specification and accompanying drawings.

In testimony whereof I have hereunto signed my name before two subscribing witnesses.

SAMUEL S. ALLEN.

Witnesses:
JOHN F. CLARK,
SAML. GRUBB.